United States Patent
Fassbender et al.

[11] Patent Number: 5,958,249
[45] Date of Patent: Sep. 28, 1999

[54] METHOD AND APPARATUS FOR WITHDRAWING EFFLUENT FROM A SOLIDS-CONTACTING VESSEL

[75] Inventors: John J. Fassbender, Green Bay, Wis.; Donald N. Ruehrwein, Batavia; Daniel H. Phillips, Hinckley, both of Ill.

[73] Assignee: Chicago Bridge & Iron Company, Plainfield, Ill.

[21] Appl. No.: 08/986,423

[22] Filed: Dec. 8, 1997

Related U.S. Application Data

[63] Continuation-in-part of application No. 08/550,743, Oct. 31, 1995, Pat. No. 5,695,648.

[51] Int. Cl.$^6$ ............................ B01D 21/30; B01D 21/28; B01D 21/32
[52] U.S. Cl. .................... 210/739; 210/87; 210/512.1; 210/521; 210/745; 210/801
[58] Field of Search .................... 210/87, 94, 97, 210/248, 512.1, 512.3, 519, 522, 523, 525, 538, 540, 739, 745, 776, 787, 788, 800, 801; 405/87

[56] References Cited

U.S. PATENT DOCUMENTS

| | | |
|---|---|---|
| 2,021,672 | 11/1935 | Spaulding . |
| 2,127,314 | 8/1938 | Spaulding . |
| 2,259,717 | 10/1941 | Zentner . |
| 2,347,318 | 4/1944 | Gurney . |
| 2,355,069 | 8/1944 | Green . |
| 2,366,898 | 1/1945 | Gurney . |
| 2,368,354 | 1/1945 | Green . |
| 2,377,545 | 6/1945 | Felsecker . |
| 2,721,173 | 10/1955 | Lawlor . |
| 4,011,164 | 3/1977 | McGivern ............................ 210/523 |
| 4,146,471 | 3/1979 | Wyness . |
| 4,765,891 | 8/1988 | Wyness ............................... 210/525 |
| 4,956,100 | 9/1990 | Mikkleson ......................... 210/523 |
| 5,188,238 | 2/1993 | Smisson et al. ................ 210/512.1 |
| 5,695,648 | 12/1997 | Fassbender et al. ............... 210/739 |
| 5,695,655 | 12/1997 | Smati .................................. 210/525 |
| 5,804,062 | 9/1998 | Wyness ............................... 210/525 |

*Primary Examiner*—Joseph W. Drodge
*Attorney, Agent, or Firm*—Marshall, O'Toole, Gerstein, Murray & Borun

[57] ABSTRACT

A method and apparatus are disclosed which provide enhanced solids-contacting vessel performance in which untreated liquid is injected into a lower portion of the vessel so as to flow in substantially helical and upward directions, solids separating from the untreated liquid into a suspended and rotating sludge blanket. The apparatus includes devices for withdrawing effluent from the vessel from a variety of locations depending upon the flow characteristics of the liquid in the vessel. The apparatus may include a radial weir trough that can be moved vertically within the vessel.

16 Claims, 7 Drawing Sheets

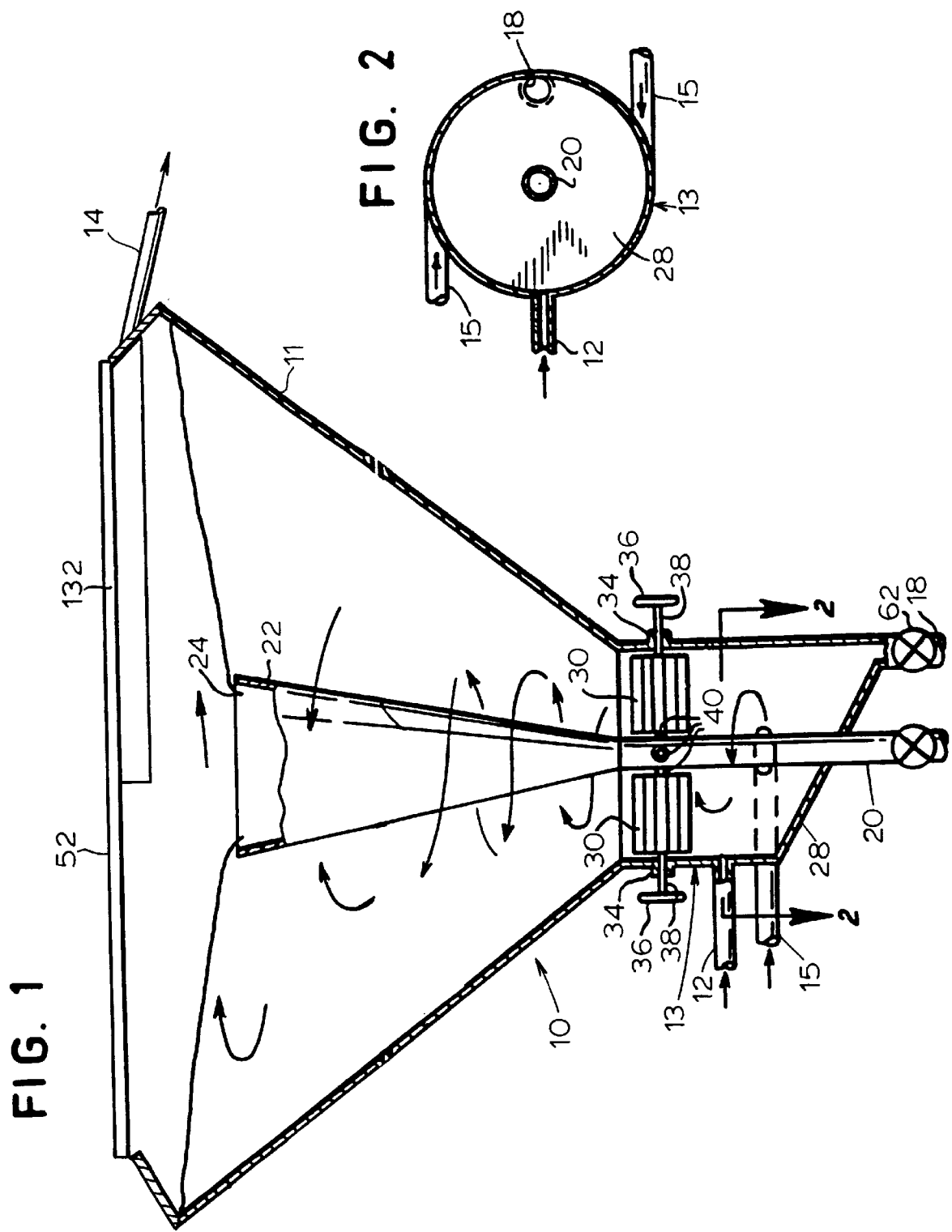

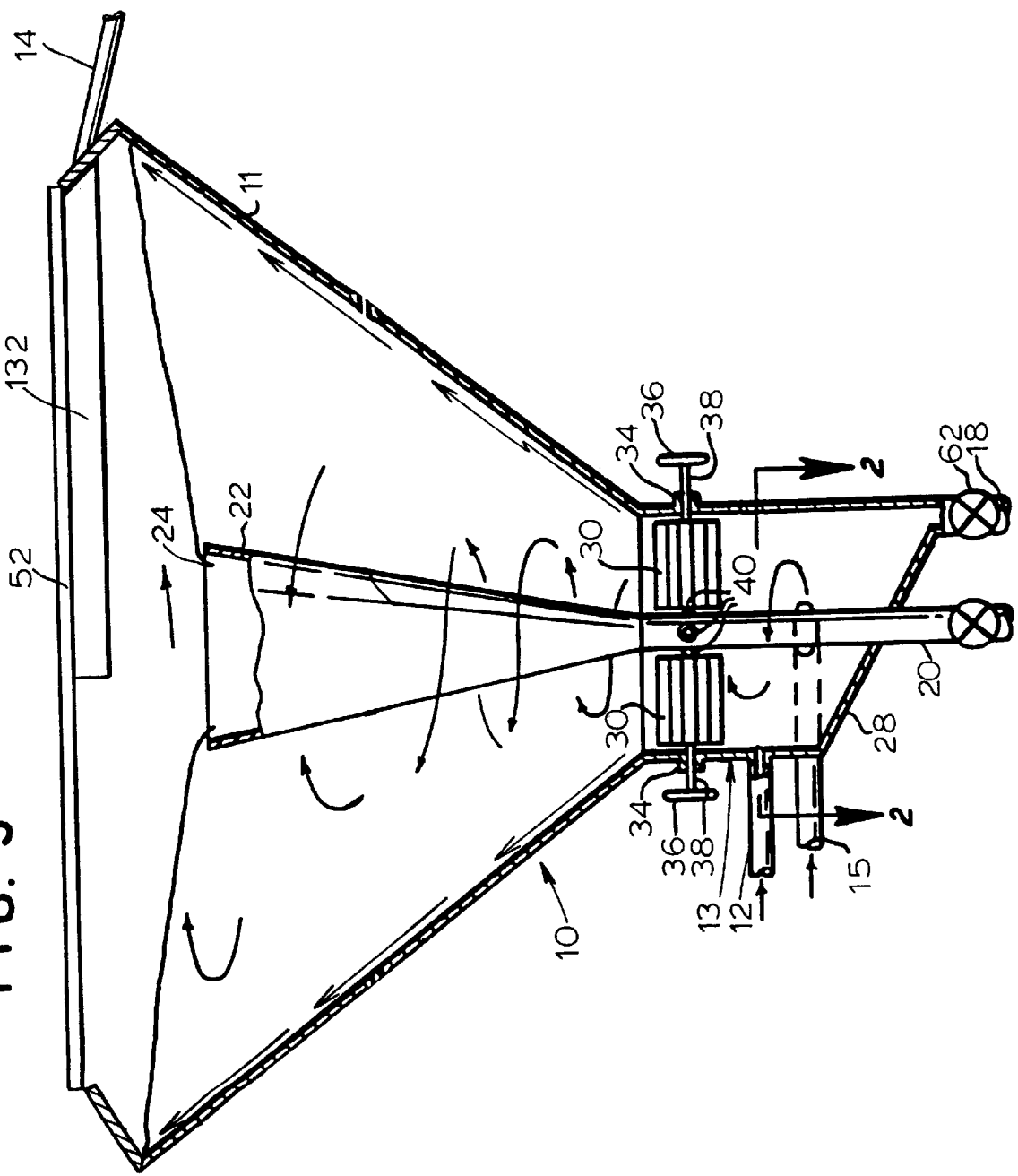

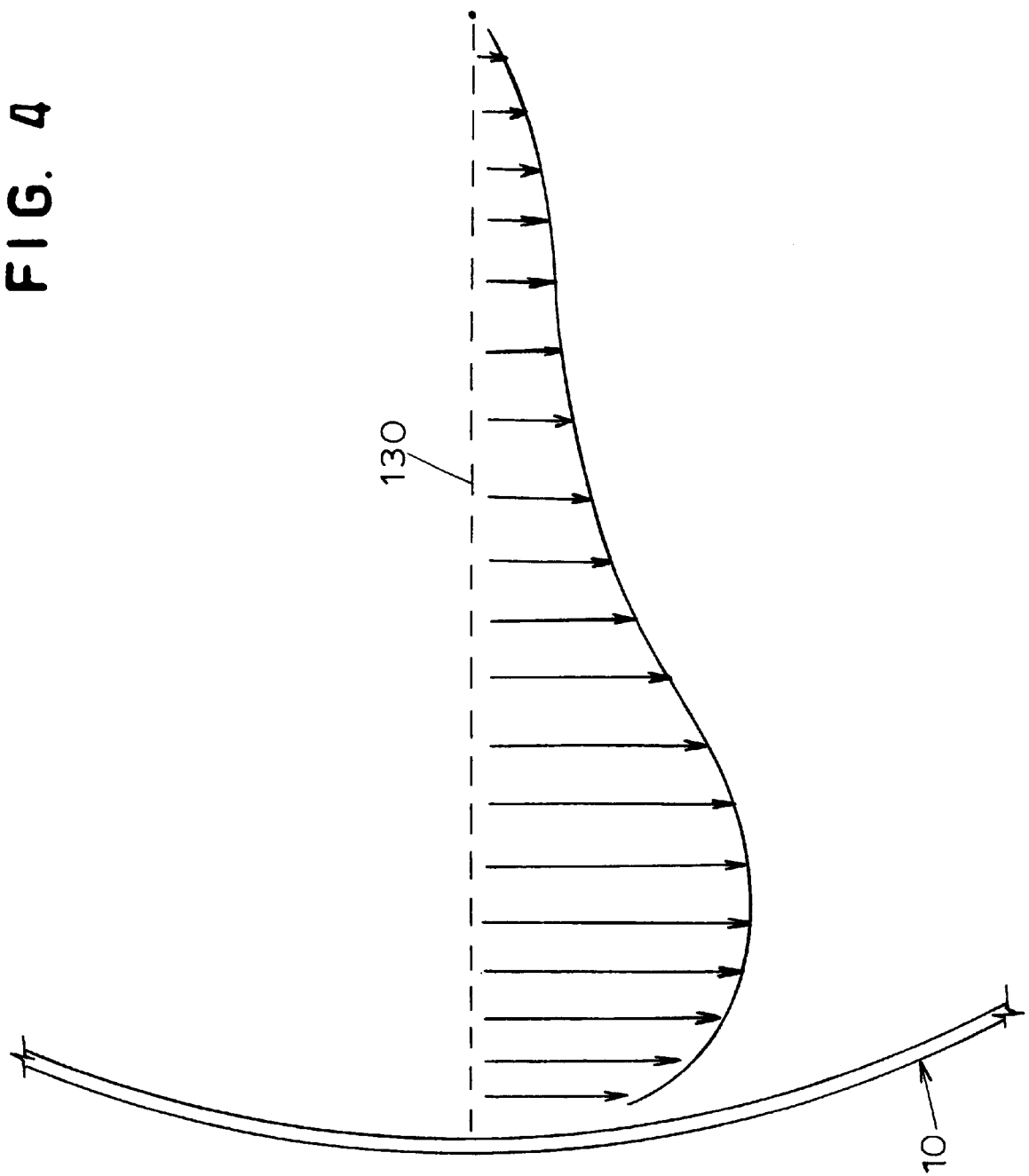

METHOD AND APPARATUS FOR WITHDRAWING EFFLUENT FROM A SOLIDS-CONTACTING VESSEL

CROSS-REFERENCE TO RELATED APPLICATION

This is a continuation in part of co-pending application Ser. No. 08/550,743, filed Oct. 31, 1995, which issued on Dec. 9, 1997 as U.S. Pat. No. 5,965,648.

BACKGROUND OF THE INVENTION

This invention relates to methods and apparatus for withdrawing effluent from a solids-contacting vessel and particularly to an improved method and apparatus for effluent withdrawal to obtain improved vessel performance.

In solids-contacting vessels, liquid having suspended or dissolved solids is introduced into the vessel for removal of a portion of the solids, particularly those originally in the liquid or those precipitated from the liquid having a density greater than the liquid in which they are carried. In such vessels, the untreated liquid is introduced into a lower portion of the vessel and removed from an upper portion of the vessel. During the liquid's upward travel, most of the suspended solids are removed, typically with the aid of precipitating and/or flocculating agents added to the vessel.

One such vessel configuration (described in detail in U.S. Pat. No. 4,146,471) provides flow characteristics that optimize solids contacting time and vessel efficiency. The vessel comprises an upper end and a lower end with a substantially conical portion having a large diameter at the upper end and a small diameter at the lower end, an inlet for an untreated liquid at the vessel lower end, and means for causing the untreated liquid, fed by the inlet to the vessel lower end, to flow in a helical path upwardly in the conical portion to a sludge-gathering zone in the large diameter conical portion, where the solids precipitate and/or agglomerate and separate in a revolving sludge blanket layer below but near the upper end of the vessel, with clarified liquid continuing above the sludge blanket. An outlet for clarified liquid is typically positioned at a fixed location somewhere near the liquid surface in the vessel.

This vessel shape provides optimum clarifying because the rotational and upward velocities of liquid in the tank decrease as the liquid nears the top, although the flow volume remains the same. As the liquid velocity decreases, the solids have an opportunity to settle and/or be conglomerated at the sludge blanket. The rotating sludge blanket is preferably gradually withdrawn through a central, and vertically adjustable, downcomer. Other means for withdrawing sludge may be used.

As is apparent from the above description, the relative velocity of the liquid throughout the vessel plays an important role in vessel performance. Under ideal circumstances, withdrawal of liquid at a fixed location along the surface will result in consistent effluent quality and previously known solids-contacting vessels are equipped with only fixed effluent outlets.

In practice, other factors affect the quality of the effluent withdrawn from the vessel, including: vessel shape; the vessel's interior smoothness; the location, size, and orientation of the liquid inlet means; the location, size, and orientation of any structures located within the vessel; the volume and density of the sludge blanket; the relative flowrate of the incoming liquid going to each of multiple liquid inlet means; start-up and shut-down procedures; varying liquid temperatures; varying liquid flow rates; and others. These factors influence effluent quality because they affect upward and rotational liquid velocities which can cause short-circuiting of the liquid through the vessel and result in shorter solids-contacting time and/or localized areas of high vertical liquid velocities that carry suspended solids that would normally settle up through the clarification portion of the vessel to the effluent withdrawal means. Further, zones of liquid along a horizontal radius of the vessel near the sludge blanket may have higher upward and/or rotational velocities than others. Higher upward and/or rotational velocities generally result in less effective solids removal and higher percentage of solids retained in effluent. Thus, controlling high velocity zones or removing effluent from zones of desired velocities results in improved vessel performance. Unfortunately, these zones cannot be accurately and precisely determined at design of the vessel and they vary due to changes in the flow rate, temperature chemical feed rates, etc. which can also vary over relatively short periods of operating time. Known fixed effluent withdrawal units cannot adapt to changing conditions within the vessel.

SUMMARY OF THE INVENTION

The present invention overcomes the shortcomings of the known solids-contacting vessels with fixed effluent withdrawal systems. In accordance with the present invention, there is provided a method for withdrawing effluent from a solids-contacting vessel in which untreated liquid is injected into a lower portion of the vessel so as to flow in a substantially tangential direction, or injected in some manner other than tangentially so that, with the aid of baffles or other means, an upward helical flow pattern is obtained to separate the solids from the liquid in a suspended and rotating sludge blanket below the surface of the liquid in the tank. The method includes the steps of: monitoring the velocity of the liquid above the rotating sludge blanket to identify areas of relatively low velocity and areas of relatively high velocity, and withdrawing effluent from areas of desired liquid velocity.

The method step of selectively withdrawing effluent includes opening a portion of a partially submerged radial weir effluent withdrawal device within the area of desired liquid velocity to receive effluent. This can be done either by manipulating the size of openings in the radical weir, or by raising or lowering the weir itself.

The adjustable radial weir may also be used to control the velocity of the liquid so that the velocity profile is more uniform.

The method step of monitoring the velocity of the liquid includes injecting die into the liquid along a substantially radial line above the rotating sludge blanket and observing the radial dye line for distortion brought on by a varying velocity profile in the liquid. Alternatively, this step can be performed by positioning velocity probes in the liquid above the sludge blanket. Velocity probes may be permanently mounted or portable devices. This step may also be performed by observation of sludge particles moving on top of the sludge blanket at velocities relative to the liquid velocity in that zone.

Also in accordance with the present invention there is provided an apparatus for withdrawing effluent from a solids-contacting vessel in which untreated liquid is injected into a lower portion of the vessel so as to flow in substantially helical and upward directions to separate the solids from the liquid in a suspended and rotating sludge blanket below the surface of the liquid in the tank, the apparatus including: a trough positioned substantially horizontally and radially in the vessel and at least partially submerged in the liquid; one or more inlet means mounted on the trough; means for opening and closing the inlet means or the size of the inlet means beneath the liquid surface to control the amount of liquid that flows into the trough; and means for removing liquid from the trough. A substantially horizontal trough which is located at an angle to the radial line could also be used. Individual effluent pipes, sliding gates, and valves or other means, spaced across the radial dimension could also be used.

BRIEF DESCRIPTION OF THE DRAWINGS

FIG. 1 is a cross-sectional view of a solids-contacting vessel is which applicants' process may be performed, showing the typical direction of liquid flow through the vessel;

FIG. 2 is a transverse cross-sectional view of the lower portion of the apparatus of FIG. 1.;

FIG. 3 is a cross-sectional view of a vessel showing a possible deviation from typical desired flow patterns through the vessel;

FIG. 4 is a partial plan view of a vessel showing areas of irregular flow patterns in zones of relatively high velocity and relatively low velocity;

DETAILED DESCRIPTION OF THE DRAWINGS

Figure 5:
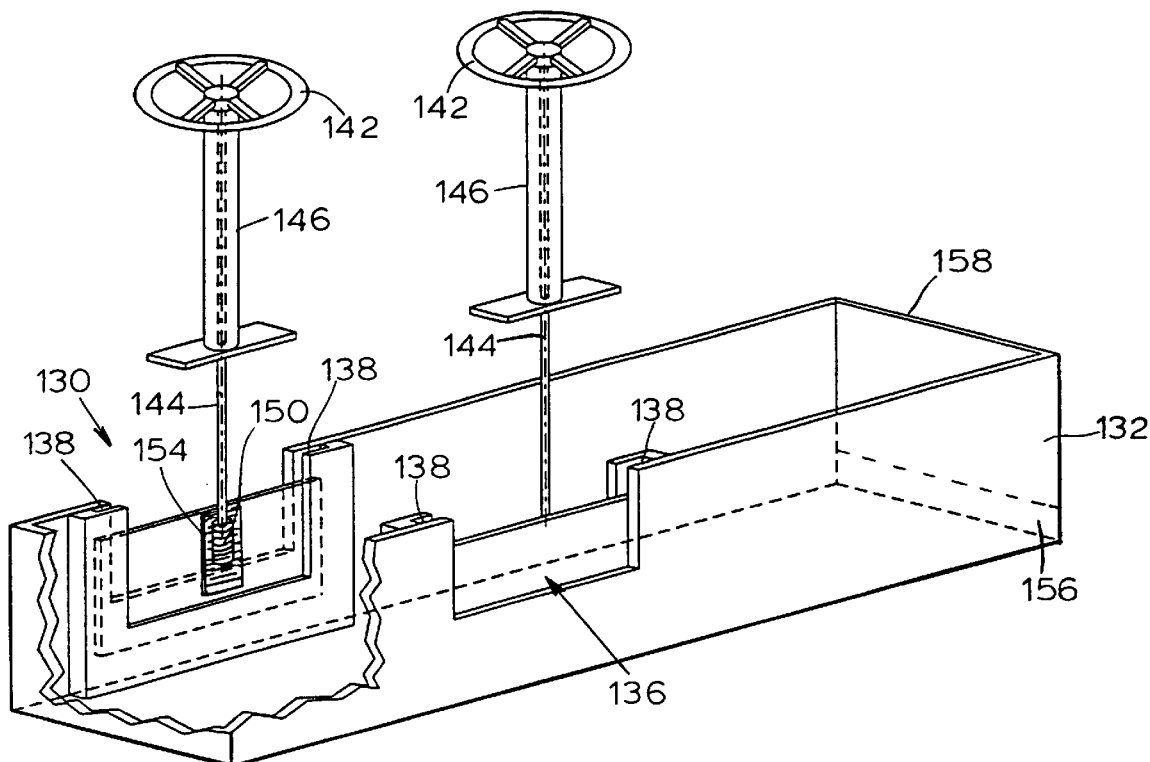
FIG. 5 is a partial perspective view of an effluent withdrawal weir with vertically sliding gates for selectively withdrawing effluent from the vessel.

Referring in more detail to the drawings, in FIG. 1 a vessel 10 that may be and is preferably used with the present invention is shown having walls 11 formed in the shape of a frustum of a cone with the minimum diameter located at the bottom and with the maximum diameter located near the top. Attached to the lower extremity of the cone is a cylindrical inlet chamber 13 having one or more tangential inlets 15 for water and one or more inlets 12 for water-treating chemicals. The chemical inlet 12 is preferably located so the entering chemicals flow across the path of water entering through inlets 15 to insure adequate mixing of the chemicals and of the water to be treated. The cylindrical inlet chamber 13 has a sloping bottom 28 provided with an outlet 18 and a valve 62 so any accumulation of sludge or heavy materials may be removed, and so the equipment can easily be cleaned during down periods. In vessels such as that depicted, there may be in the cylindrical inlet chamber 13 a plurality of baffles 30 that are mounted on shafts 38 which extend through bearings 34 in the wall of that cylindrical inlet chamber and that are adjustably controlled by handles 36. The inner extremities of the shafts 38 are mounted in bearings 40 on vertical outlet pipe 20, which is located centrally of the cylindrical inlet chamber 13. These baffles are not necessary, and may be omitted from the vessel when practicing the present invention. Vertical pipe 20 extends upwardly through the cylindrical inlet chamber 13 and attaches to an optional central vertically adjustable downcomer 22 which extends upwardly and centrally in the vessel 10 to a location near the maximum diameter portion.

The top of the vessel may be covered or left open for observation purposes. As illustrated, an observation bridge 52 is positioned across the top of the vessel, and a weir trough 132 is suspended therefrom for removing effluent.

In operation, water to be clarified enters cylindrical inlet chamber 13 through tangentially-located inlets 15. The tangential inlets impart a generally helical motion to the water entering the vessel, shown by the arrows in FIG. 1 to be a lefthanded helical motion. The helical motion imparted to the inlet water causes the water to flow in a generally helical path from the inlet through the vessel vertically until it passes into a trough means, such as a weir (described below), and out through outlet 14.

Treating chemicals, such as ferrous sulfate, aluminum sulfate, or other conventional chemicals, may be added through chemical inlet 12, which is arranged so the flow of chemicals into the mixing chamber is not parallel to the flow of water, thus promoting mixing of the chemicals with the inlet water. On being introduced into the chamber, the chemicals react with the inlet water to form a precipitate and/or floc which converts the dissolved and/or suspended solid materials in the water to a form that can be removed by sedimentation. The mixture of water and chemicals rises and may contact baffles 30 when present to promote and increase additional mixing. The primary function of baffles 30, however, is to control the rotational and vertical velocity of the stream of water in the tank, and to provide as uniform velocities as possible.

Ideally, the mixed water and chemicals rise in a generally helical path out of cylindrical inlet chamber 13 into the conical section of the vessel. As the mixture rises through the conical portion of the vessel, the cross-sectional area of the vessel increases, resulting in a corresponding decrease in the space flow rate of the treated water through the vessel, although the net flow rate remains constant. Additional baffling (see U.S. Pat. No. 4,146,471) may be used to control vertical and rotational velocity of the liquid through the vessel 19, but they are not necessary for the satisfactory performance of the invention.

The helical path of motion imparted to the water and chemicals and the decreasing space flow rate increase the number of contact opportunities of the water and chemicals over that of a straight flowthrough system by lengthening the path of travel. Increased contact allows adequate opportunity for the chemicals to adequately react with, precipitate, coagulate, and flocculate the contaminating solid materials present in the liquid. As the space flow rate decreases, the vertical velocity of the water decreases until the flocs that are formed are no longer carried by the drag or lift and turbulence of the water, and a point of equilibrium is reached where the lifting force of the water and the counteracting gravitational force on the precipitates and/or flocculated particles are in equilibrium, causing a suspended rotating sludge blanket of the precipitated and/or flocculated materials to accumulate in the vessel. This rotating sludge blanket is suspended at or below the maximum diameter of the vessel. The treated water continues to flow vertically through the rotating sludge blanket, leaving the suspended matter behind in the rotating sludge blanket. The treated water flows through an effluent collection means (described below) into a collecting chamber and out through outlet 14 as clarified effluent water. Treatment chemicals and flocculated particles continue to react and to collect solid matter from the water flowing through the rotating sludge blanket, thereby causing floc growth, until the sludge particles ultimately move into the central quiescent zone 24 and are removed through the mouth of the central vertical downcomer 22.

In the rotating sludge blanket, the rotational forces imparted to the water and chemicals in the generally helical path tend to push the heavier particles and flocculated material generally outwardly toward the periphery of the vessel 10. However, by removing the particles in a central quiescent zone, the floc tends to flow towards the center of the vessel. The overall result is the development and maintenance of a uniform rotating sludge blanket. A uniform rotating sludge blanket provides uniform filtration and clarification of the water that passes upwardly through the rotating sludge blanket. Other sludge removal means can be used, as the illustrated means is not critical to realizing the benefits of the present invention.

Although the above-described flow pattern is generally uniform and constant during operation of the solids-contacting vessel 10, certain vessel and operating conditions may alter the flow patterns and localized rotational and vertical velocities of the liquid. For example, some of the liquid entering the vessel 10 could "short circuit" the helical flow pattern as illustrated in FIG. 1 and flow directly up the wall 11 of the vessel 10 as illustrated by arrows in FIG. 3. Without adequate velocity reduction and detention time, the quantity of liquid that short circuits the ideal helical flow pattern will retain a greater amount of solids that would preferably be left in the vessel 10, rather than being withdrawn together with cleaner effluent. If the effluent withdrawal means were located at the end of the short circuit path, then the effluent would contain unnecessarily high levels of solids regardless of how efficient other solids-contacting aspects of the treatment process perform.

Another phenomenon that can inhibit vessel efficiency is localized zones of relatively high velocity liquid resulting from such events as rising atmospheric or liquid temperatures, blocked effluent withdrawal weirs, vessel characteristics, etc. As described above, solids-contacting vessels perform efficiently due to contact opportunities with treatment chemicals and steadily decreasing velocity through the vessel. Obviously, zones of increased velocity defeat these objectives and liquid within these zones will have a higher solids content than liquid in zones of relatively lower velocity. Because the unique events are not easily controlled, it is desirable to withdraw effluent from zones of relatively low velocity.

On the other hand, zones of little or no velocity may have other undesirable attributes that would deteriorate the quality of effluent. Visual inspection and/or chemical testing provide an operator with information about optimum liquid velocities for the highest quality effluent to enhance vessel performance.

To determine zones of relatively high rotational velocity versus zones of relatively low rotational velocity a number of methods can be employed. One example is to inject a line of dye along a radius of the vessel 10 using a long syringe. Distortion of the dye line will clearly indicate zones of relatively high rotational velocity and the means for withdrawing effluent from the vessel will be employed in zones away from the zone of high velocity.

Another method for monitoring rotational flow velocities is the use of active electronic flow velocity gauges such as magnetic velocity probe, a turbine wheel velocity probe, etc. Passive devices such as streamers attached to a submerged radius rope or line in the vessel 10 will provide constant indicators of relative velocity because the streamers in high velocity zones will tend to float horizontally rather than vertically. Further, visual observation of floc particles on the surface of the sludge blanket indicate the zones of high or low liquid velocities.

At times the vertical short circuit path illustrated in FIG. 3 will be visible to the naked eye because the liquid will carry sludge particles above the surface of the sludge blanket in areas with high vertical liquid velocities.

FIG. 4 illustrates a partial plan view of a vessel with a radius line 130. The longer arrows indicate high liquid rotational velocities and the shorter arrows indicate lower liquid rotational velocities. Depending on the desired effluent quality, effluent can be withdrawn at any point on the radius profile. Typically, zones of lower velocities (shorter arrows) provide optimum effluent quality and are where effluent should preferably be withdrawn.

FIG. 5 illustrates an apparatus 130 for withdrawing effluent from the vessel from selected locations of relatively low rotational velocity along a radius of the vessel. The apparatus 130 includes a trough 132 which is positioned in the vessel and partially submerged in the in the liquid.

The trough 132 includes a pair of sliding gates 136 positioned on opposing sides of the trough 132. The use of one or more sliding gates on one side of the trough only may be used.

The sliding gates 136 are positioned within vertical slots 138 or other suitable retention means with a snug fit and/or gaskets to limit seepage around the sides of the plates. Preferably, all of the effluent will flow over the top of the gates 136.

When a zone of relatively low velocity effluent is identified and effluent from that zone is desired, the sliding gates are lowered by rotating hand wheels which are secured to a walkway over the vessel 10. The hand wheels 142 have shafts 144 are retained in sleeves 146 fixed to the walkway, but are still free to rotate. The lower portions of the shafts 144 are fitted with worm gears 150 that engage racks 154 that are mounted on the sliding gates 136. As effluent spills over the sliding gates 136 it flows into the weir trough 132 and out of an outlet 156 at the outer end 158 of the weir trough 132.

Conversely, when it is desired to slow the liquid velocity in a particular zone, gates (or the valves and pipes described below) can be closed to extend the vessel retention time for that liquid.

Although not illustrated, similar sliding gates may be positioned adjacent one another or spaced apart along the entire length of the weir trough 132. Such an arrangement enables withdrawal of effluent at desired locations along the radius of the vessel and the number of gates affects the degree with which various zones can be manipulated. The greater the number of gates, the more selective withdrawal can be.

Figure 6:
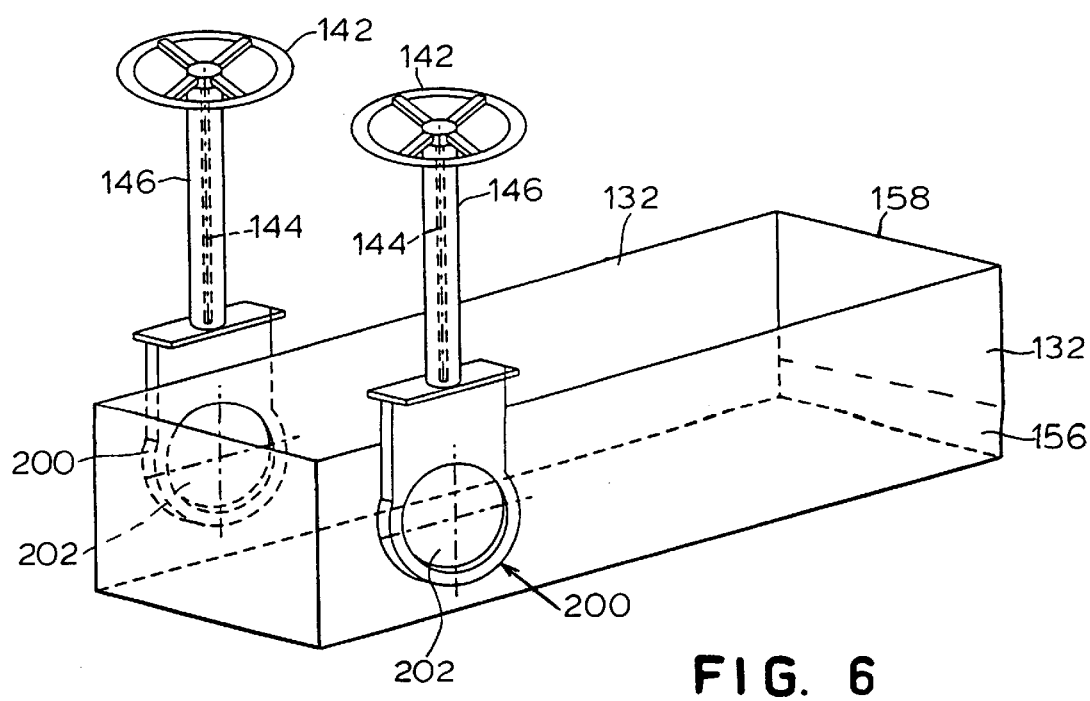
FIG. 6 is a partial perspective view of a first alternative effluent withdrawal means.

Illustrated in FIG. 6 is an optional embodiment of the effluent withdrawal apparatus in the form of valves 200 that are opened as desired to receive effluent into the weir trough 132. Like the sliding gates described above, the valves 200 are controlled by hand wheels 142, which raise or lower a vertically movable knife gate 202 to open or close the gate as desired. Again, a number of gates may be positioned along the weir trough.

Figure 7:
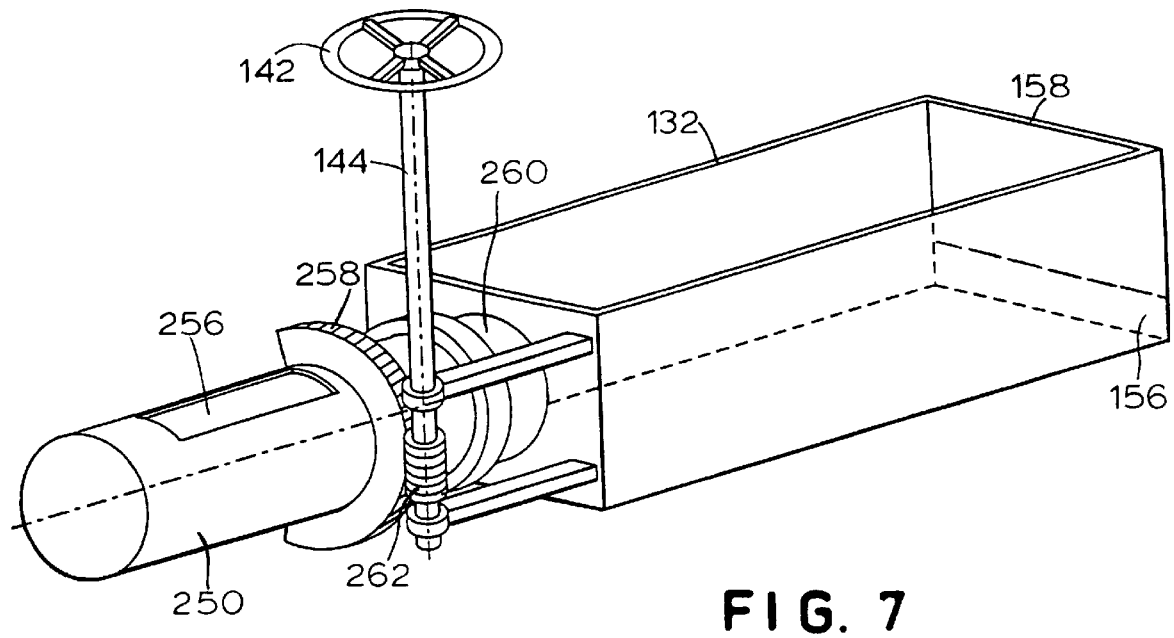
FIG. 7 is a partial perspective view of an effluent withdrawal means with a rotating pipe for receiving effluent.

Another alternative is illustrated in FIG. 7. It includes a rotating pipe 250 extending outwardly from the trough 132 and in liquid communication therewith. The rotating pipe 250 defines an slot or opening 256, such as the rectangular opening depicted. The rotating pipe 250 is in rotating- and substantially-sealed contact with a nipple 260 that itself is in liquid communication with the trough 132. The rotating pipe may be positioned parallel to or perpendicular to the radius of the vessel or at any angle therebetween. The rotating pipe 250 is preferably positioned substantially horizontally and about half submerged in the liquid in the vessel. When it is desired to withdraw effluent through the opening in the rotating pipe 250, a hand wheel 142 like that shown above may be rotated to rotate a shaft 144 and a worm gear 262 fixed to the lower portion of the shaft 144. The pinion gear 262 is meshed with an arc-shaped rack 258 that is fixed to the rotating pipe 250. As the hand wheel 142 is turned, the pipe 250 rotates until the opening 256 is at least partially submerged and effluent spills into the pipe, flows through the nipple 258, and into the weir trough 158. Different lengths of pipe and slots may be used. Further, the edges of the slot may be angled so that, when lowered to the water surface, they draw more flow from one end.

Figure 8:
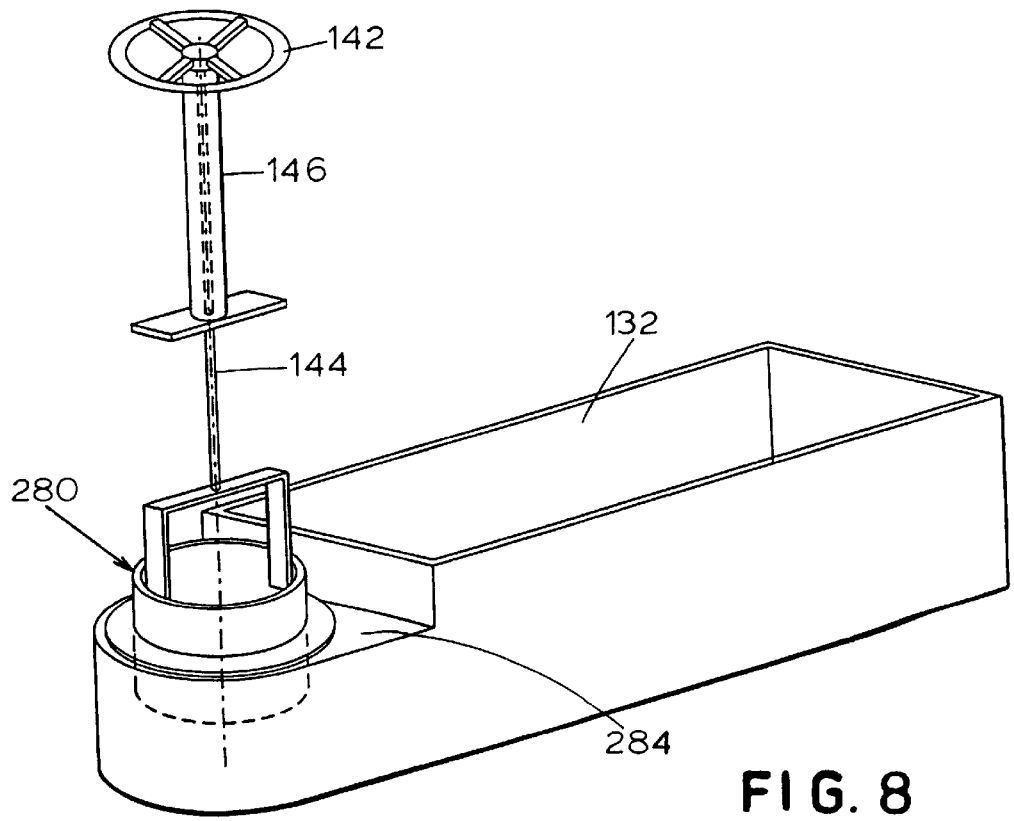
FIG. 8 is a partial perspective view of a slip pipe mounted on an effluent withdrawal trough.

In FIG. 8, a vertically-oriented slip pipe 280 is illustrated to perform the effluent-receiving function in much the same way as the rotating pipe of FIG. 7 except that the slip pipe 280 moves vertically downward into the liquid to receive effluent into the end of the pipe. Once the effluent has spilled into the slip pipe 280, it flows into a covered portion of the weir trough 284 and out of the vessel 10. Like the gates described above, more than one slip pipe may be used.

Figure 9:
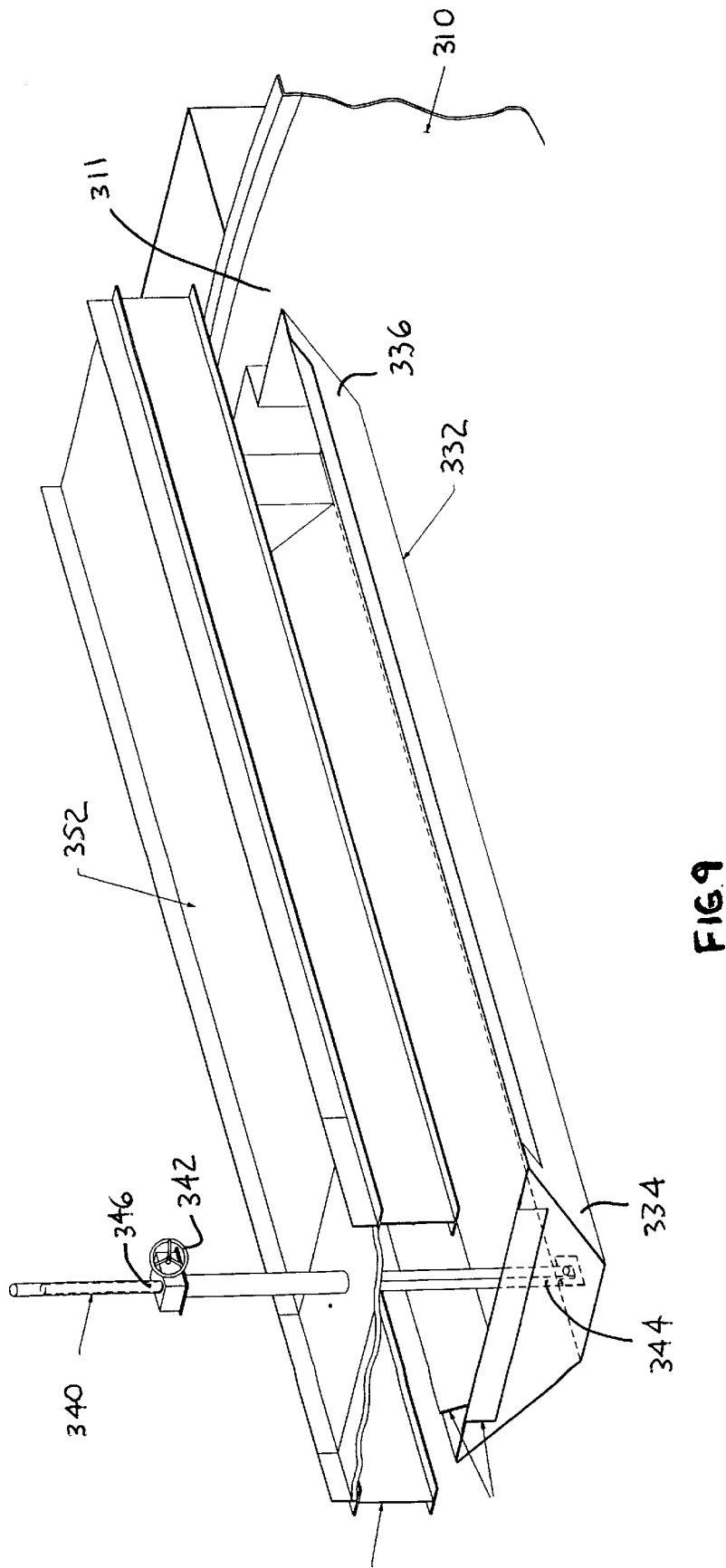
FIG. 9 is a perspective view of a radial trough that can be raised or lowered.

Another alternative is illustrated in FIG. 9. In that embodiment, a radial weir trough 332 has an inward end 334 that is suspended from an observation bridge 352 by an actuator shaft 340. The actuator shaft has a lower end 344 that is fixed to the inward end of the radial trough, and an upper end 346 that engages a mechanism 342 accessible from the observation bridge. The mechanism, such as a jack screw, can be used to raise or lower the actuator shaft, causing the inward end of the radial trough to be raised or lowered. Alternatively, an actuator like that illustrated in FIG. 5 could be attached to the trough itself, rather than a gate, to provide the same result. Other mechanisms could of course also be used without departing from the scope of the invention.

As illustrated, a radially-outward end 336 of the trough 332 is hinged at the outer wall 311 of the vessel 310. As a result, raising the inward end 334 of the trough causes the inward end to rise with respect to the outward end. This in turn causes the intersection between the surface of the liquid in the vessel and the top edge of the trough to move radially outwardly as more and more inward portions of the trough rise above the surface of the liquid. Similarly, lowering the inward end of the trough causes the interesection to move radially inwardly, as more and more inner portions of the trough sink beneath the surface of the liquid. Thus, by manipulating the depth of the inward end of the trough, control can be exercised over the amount of effluent withdrawn from one portion of the vessel with respect to another.

Of course, other portions of the radial trough could be hinged or controlled by actuators to provide comparable results. For example, the inner end or a middle portion of the trough could be maintained at a constant depth while the depth of the outer end of the trough is controlled by an actuator. Alternatively, the depth of both ends of the trough could be controlled by actuators. Yet anther alternative would be to provide a multiple-section trough, in which an depth-adjustable section is hinged to a fixed-depth section.

Figure 10:
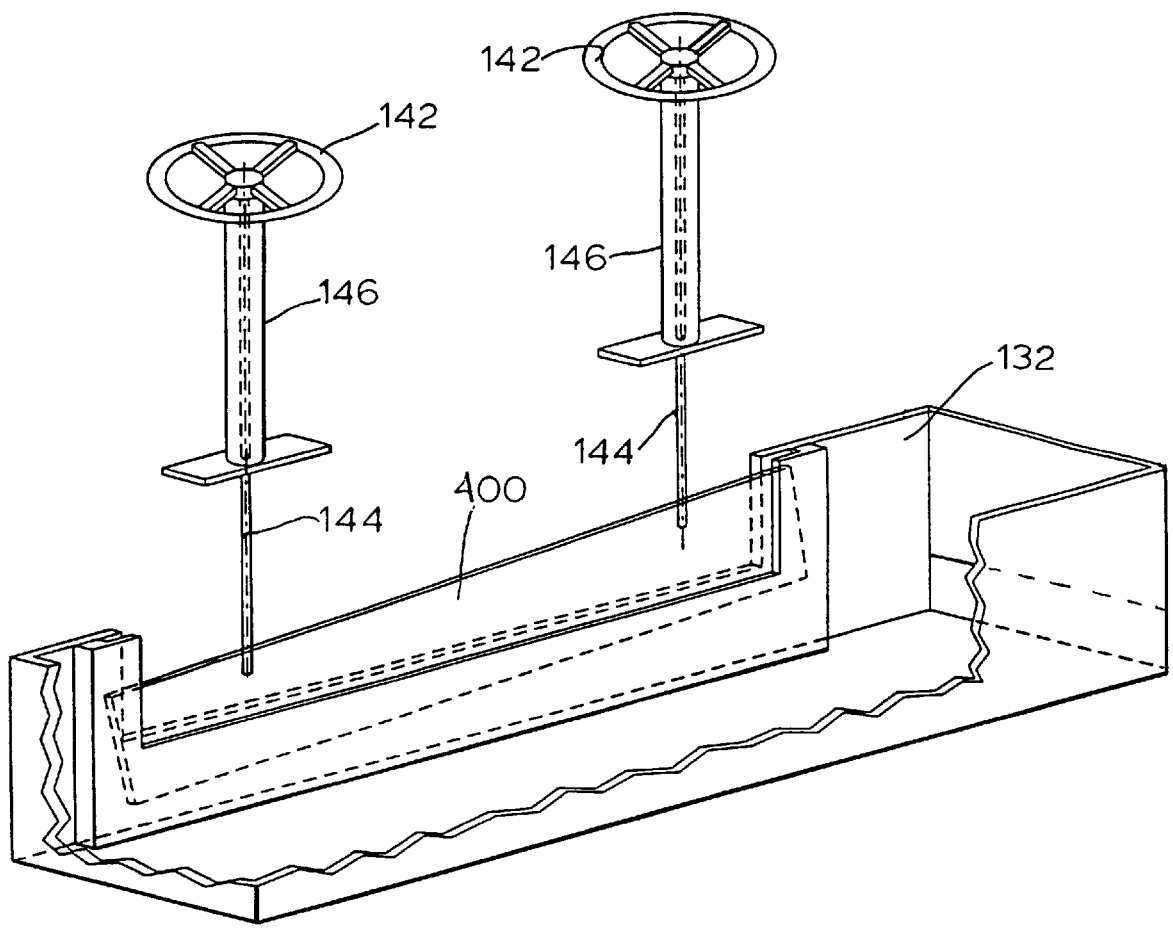
FIG. 10 is a partial perspective view of a sloping weir plate mounted on an effluent withdrawal trough.

Finally, FIG. 10 illustrates a sloping sliding gate 400 that is similar to the sliding gate of FIG. 5, except that it is substantially longer and is controlled, not by one, but two (or more) hand wheels 142. This elongated gate 400 permits the operator to adjust the hand wheels 142 to set the ends of the gate 400 at different elevations. This arrangement is desirable because it will receive liquid over longer lengths using fewer gates. Although this arrangement is less adaptable than those using shorter gates, there are some vessels 10 in which the rotational velocity of the liquid is not as variable and would benefit from the reduced number of plates. Multiple sloping sliding gate weirs may be used.

It will be appreciated that one skilled in the art could modify the process without departing from the spirit of the invention disclosed.

We claim:

1. A method for withdrawing effluent from a solids-contacting vessel in which untreated liquid is injected into a lower portion of the vessel and flows in a substantially helical and upward direction, separating the solids from the liquid in a suspended and rotating sludge blanket below the surface of the liquid in the vessel, the method comprising the steps of:

monitoring the velocity of the liquid above the rotating sludge blanket to identify areas of relatively low velocity and to identify areas of relatively high velocity across the surface of the liquid;

identifying areas of optimum liquid velocity; and adjusting the withdrawal of effluent from the identified areas of optimum liquid velocity by adjusting the height of effluent withdrawal devices positioned at different radial distances from the center of the vessel across the rotating surface of the liquid.

2. The method of claim 1 in which the step of adjusting the withdrawal of effluent comprises the step of:

lowering a portion of a partially submerged radial weir adjacent the areas of optimum liquid velocity liquid to receive effluent.

3. The method of claim 1 in which the step of monitoring the velocity of the liquid comprises the step of:

injecting dye into the liquid along a substantially radial line above the rotating sludge blanket; and observing the radial dye line for distortion brought on by a varying velocity profile in the liquid.

4. The method of claim 1 in which the step of monitoring the velocity of the liquid comprises the step of:

positioning velocity probes in the liquid above the sludge blanket to collect velocity data.

5. The method of claim 1, in which the withdrawal devices are opposite radial ends of a single radial weir, one of the ends of the weir being selectively vertically adjustable with respect to the opposite end.

6. The method of claim 1, in which the height of one of the withdrawal devices that is near one of the areas of optimum liquid velocity is lowered.

7. The method of claim 1, in which the height of one of the withdrawal devices that is near one of the areas of optimum liquid velocity is lowered, while the height of another withdrawal device is raised.

8. The method of claim 1, in which the height of one of the withdrawal devices that is near one of the areas of optimum liquid velocity is lowered, while the height of another withdrawal device at a different radial distance from the center of the vessel is raised.

9. A method for withdrawing effluent from a solids-contacting vessel in which untreated liquid is injected into a lower portion of the vessel and flows in substantially helical and upward directions, separating the solids from the liquid in a suspended and rotating sludge blanket below the surface of the liquid in the vessel, the method comprising the steps of:

monitoring the velocity of the liquid above the sludge blanket to identify areas of relatively low rotational velocity and areas of relatively high velocity across the surface of the liquid;

selectively raising a portion of a radial weir trough at one radial distance from the center of the vessel near an area of relatively undesireable velocity; and withdrawing liquid from the vessel through a portion of the radial weir trough another radial distance near an area of desired liquid velocity on the rotating surface of the liquid.

10. The method of claim 9 in which the step of withdrawing liquid from near an area of desired liquid velocity comprises the step of:

lowering a portion of a weir trough positioned near the area.

11. The method of claim 9 in which the step of monitoring the velocity of the liquid comprises the steps of:

injecting dye into the liquid along a substantially radial line above the rotating sludge blanket; and observing the radial dye line for distortion due to a varying velocity profile in the liquid.

12. The method of claim 9 in which the step of monitoring the velocity of the liquid comprises the step of:

positioning velocity probes in the liquid above the sludge blanket to collect velocity data.

13. Apparatus comprising:

a solids-contacting vessel in which untreated liquid is injected into a lower portion of the vessel and flows in substantially helical and upward directions, separating the solids from the liquid in a suspended and rotating sludge blanket below the rotating surface of the liquid in the vessel;

first and second weir trough portions on one or more troughs, each portion comprising means for withdrawing effluent from the rotating surface of liquid in the solids-contacting vessel, one of the portions being disposed radially between the other portion and the center of the vessel;

means for selectively raising or lowering each of the weir trough portions to control the amount of liquid that flows into that portion; and means for removing liquid from the troughs.

14. The method of claim 13, in which a weir trough portion that is near an area of optimum liquid velocity is lowered.

15. The method of claim 13, in which a weir trough portion that is near an area of optimum liquid velocity is lowered, while another weir trough portion is raised.

16. The method of claim 13, in which a weir trough portion that is near an area of optimum liquid velocity is lowered, while a weir trough portion at a different radial distance from the center of the vessel is raised.

* * * * *